United States Patent
Jecker et al.

(10) Patent No.: US 9,415,804 B2
(45) Date of Patent: Aug. 16, 2016

(54) DEVICE AND METHOD FOR DISPLAYING OBJECTS IN THE SURROUNDINGS OF A VEHICLE

(75) Inventors: Nicolas Jecker, Esslingen (DE); Oliver Grimm, Flein (DE); Vsevolod Vovkushevsky, Bietigheim-Bissingen (DE); Tobias Geiger, Bietigheim-Bissingen (DE)

(73) Assignee: VALEO Schalter und Sensoren GmbH, Bietiigheim-Bissingen (DE)

( * ) Notice: Subject to any disclaimer, the term of this patent is extended or adjusted under 35 U.S.C. 154(b) by 1288 days.

(21) Appl. No.: 13/321,230

(22) PCT Filed: Jun. 7, 2010

(86) PCT No.: PCT/EP2010/003408
§ 371 (c)(1),
(2), (4) Date: Nov. 18, 2011

(87) PCT Pub. No.: WO2010/139487
PCT Pub. Date: Dec. 9, 2010

(65) Prior Publication Data
US 2012/0065877 A1    Mar. 15, 2012

(30) Foreign Application Priority Data

Jun. 5, 2009   (DE) .......................... 10 2009 024 062

(51) Int. Cl.
*G05D 1/02*   (2006.01)
*G06F 17/10*   (2006.01)
(Continued)

(52) U.S. Cl.
CPC .............. *B62D 15/0275* (2013.01); *G01S 15/87* (2013.01); *G01S 15/931* (2013.01); *H04N 7/181* (2013.01); *G01S 2013/9314* (2013.01); *G01S 2015/936* (2013.01)

(58) Field of Classification Search
USPC ......... 340/435–436, 937, 425.5, 995.24, 438;
701/300–301, 531, 31.4; 367/99;
348/148–149, 143, 153, 159
See application file for complete search history.

(56) References Cited

U.S. PATENT DOCUMENTS

| 6,704,653 B2 * | 3/2004 | Kuriya et al. ................. 701/301 |
| 6,919,917 B1 * | 7/2005 | Janssen .................. B60Q 9/005 348/143 |

(Continued)

FOREIGN PATENT DOCUMENTS

| DE | 43 33 112 A1 | 3/1995 |
| DE | 102006000245 A1 | 1/2007 |

(Continued)

OTHER PUBLICATIONS

Beamforming-Based Acoustic Imaging for Distance Retrieval; Lay-Ekuakille, A. ; Trotta, Amerigo ; Vendramin, G. Instrumentation and Measurement Technology Conf. Proc. 2008. IMTC 2008. IEEE; DOI: 10.1109/IMTC.2008.4547274; Pub Year: 2008, pp. 1466-1470.*

(Continued)

*Primary Examiner* — Cuong H Nguyen
(74) *Attorney, Agent, or Firm* — Osha Liang LLP

(57) ABSTRACT

The invention relates to a device and a method for displaying objects in the surroundings of a vehicle having a sensor arrangement, in order to sense objects in the surroundings of the vehicle and to determine the position thereof relative to the vehicle, wherein the sensor arrangement covers, with its detection range, only a partial area of the surroundings of the vehicle; in order to improve the assistance provided to the driver during parking processes and the processes of removing a vehicle from a parking space, the processing device is designed to determine the area of the surroundings of the vehicle for which no object information is yet available, since said area has not yet been passed over by the detection range of the sensor arrangement, and the display device is designed to display the extent of this area.

11 Claims, 2 Drawing Sheets

Figure 1:
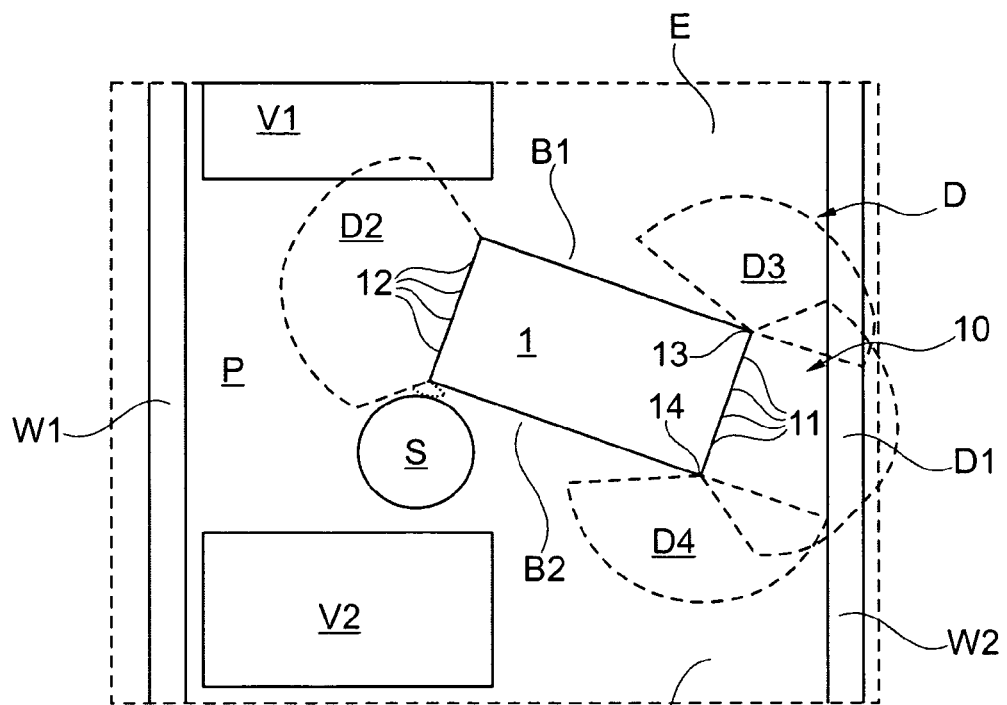

(51) Int. Cl.
  *B62D 15/02*  (2006.01)
  *H04N 7/18*  (2006.01)
  *G01S 15/87*  (2006.01)
  *G01S 15/93*  (2006.01)
  *G01S 13/93*  (2006.01)

(56) References Cited

U.S. PATENT DOCUMENTS

| | | | |
|---|---|---|---|
| 7,155,888 B2 * | 1/2007 | Diekhans | A01D 43/073 56/10.2 R |
| 7,366,595 B1 * | 4/2008 | Shimizu et al. | 701/301 |
| 7,640,108 B2 * | 12/2009 | Shimizu et al. | 701/301 |
| 8,013,721 B2 * | 9/2011 | Yamanaka et al. | 340/435 |
| 8,022,818 B2 * | 9/2011 | la Tendresse | B60Q 9/008 340/426.24 |
| 8,395,490 B2 * | 3/2013 | Yuda | 340/436 |
| 8,874,324 B2 * | 10/2014 | Eggers | B60R 13/07 296/146.4 |
| 8,885,045 B2 * | 11/2014 | Yanagi | 348/148 |
| 8,922,394 B2 * | 12/2014 | Choi | B62D 15/0285 340/932.2 |
| 9,098,928 B2 * | 8/2015 | Mizuta | G06T 11/00 |
| 2010/0220189 A1 * | 9/2010 | Yanagi | 348/148 |
| 2010/0315215 A1 * | 12/2010 | Yuda | H04N 5/2259 340/435 |
| 2011/0010041 A1 * | 1/2011 | Wagner et al. | 701/29 |
| 2012/0065877 A1 * | 3/2012 | Jecker et al. | 701/300 |
| 2012/0154592 A1 * | 6/2012 | Mizuta | G06T 11/00 348/148 |
| 2015/0043782 A1 * | 2/2015 | Lucas | B60R 1/00 382/104 |
| 2015/0332103 A1 * | 11/2015 | Yokota | G06K 9/00805 348/149 |

FOREIGN PATENT DOCUMENTS

| | | | | |
|---|---|---|---|---|
| DE | 10 2007 032698 B3 | | 9/2008 | |
| DE | 10 2008 001648 A1 | | 11/2009 | |
| DE | 102013006048 A1 | * | 10/2014 | B60R 1/00 |
| EP | 1 447 271 A2 | | 8/2004 | |
| EP | 2438464 A1 | * | 4/2012 | |
| JP | 2013191050 A | * | 9/2013 | G08G 1/16 |
| JP | 2014002752 A | * | 1/2014 | G08G 1/09 |
| JP | 2014094737 A | * | 5/2014 | B60Q 9/005 |
| KR | 2014063186 A | * | 5/2014 | B60W 50/14 |
| KR | 20140084760 | * | 7/2014 | G02B 1/105 |
| WO | 2008/055567 A1 | | 5/2008 | |
| WO | WO 2010139487 A1 | * | 12/2010 | |
| WO | WO 2016020342 A1 | * | 2/2016 | G01S 15/93 |

OTHER PUBLICATIONS

Autonomous blimp control using model-free reinforcement learning in a continuous state and action space; Rottmann, A. et al.; Intelligent Robots and Systems, 2007. IROS 2007. IEEE/RSJ International Conference on; DOI: 10.1109/IROS.2007.4399531; Pub. Yr: 2007, pp. 1895-1900.*

Urban traffic avoiding car collisions fuzzy system based on ultrasound; Alonso, L.; Oria, J.P.; Arce, J.; Fernandez, M. Automation Congress, 2008. WAC 2008. World; Publication Year: 2008, pp. 1-6.*

3D geometry representation using multiview coding of image tiles; Y. Gao; G. Cheung; T. Maugey; P. Frossard; J. Liang; 2014 IEEE International Conference on Acoustics, Speech and Signal Processing (ICASSP); Year: 2014; pp. 6157-6161, DOI: 10.1109/ICASSP.2014.6854787.*

International Search Report issued in PCT/EP2010/003408, mailed on Nov. 5, 2010, with translation, 6 pages.

German Search Report issued in the corresponding German application No. 10 2009 024 062.4, mailed on Apr. 26, 2012, 5 pages.

* cited by examiner

DEVICE AND METHOD FOR DISPLAYING OBJECTS IN THE SURROUNDINGS OF A VEHICLE

The invention relates to a device and method for displaying objects in the surroundings of a vehicle, of the type specified in the preamble of claims 1 and 11, respectively.

EP 1 447 271 A2 has already disclosed such a device and an associated method. The known device comprises a display device for displaying to the driver the position of the vehicle with respect to the lateral boundaries thereof after a parking process. In order to determine the positions of the lateral boundaries a sensor arrangement with two lateral distance sensors is provided on each side of the vehicle, said distance sensors each sensing objects in the surroundings of the vehicle to the left and to the right and determining the distance of said objects from the vehicle. The lateral distance sensors are each embodied here as ultrasound sensors with a narrow detection range, such as are usually used to measure parking spaces. The distance sensors here fulfil a double function and can be used both to measure the length of the parking space when the vehicle travels past before the parking process and to sense the parking space boundaries during the parking process.

Since the lateral distance sensors with their narrow detection range can only sense a partial area of the lateral surroundings of the vehicle, an evaluation device is provided which stores in memory the position, with respect to the vehicle, of objects or object areas which have already been sensed, and continuously updates said position on the basis of the route travelled along as the vehicle moves. In the course of the movement of the vehicle, the detection ranges of the lateral sensors therefore pass over the respective lateral surroundings of the vehicle, with the result that the lateral surroundings of the vehicle have been completely scanned after the parking process and can be displayed on the display device. The display device then displays a virtual plan view of the vehicle and the lateral surroundings of the vehicle with the lateral boundaries of the parking space.

This display can assist the driver, directly after the parking process, in making the decision as to which vehicle door can be opened to what extent and whether it is necessary to correct the parked position of the vehicle. However, the known display is suitable only to a limited degree for assisting the driver at a later time in carrying out the parking process itself or in carrying out a process for removing the vehicle from a parking space, since the surroundings of the vehicle may have changed since the parking process.

The object of the invention is to further develop a device and method for displaying objects in the surroundings of a vehicle of the type mentioned in the preamble of claim 1 or claim 11 to the effect that the assistance provided to the driver in carrying out parking processes and processes for removing the car from the parking space is improved.

This object is achieved according to the invention by means of the features of claim 1. Further features which advantageously refine the invention can be found in the dependent claims.

The advantage achieved with the invention is that information about the surroundings of the vehicle are already displayed on the display device when said surroundings of the vehicle have not yet been completely sensed by the sensor arrangement. In this context, the area of the surroundings of the vehicle for which no object information is yet available, since said area has not yet been passed over by the detection range of the sensor arrangement, is continuously determined. The dimensions of this area are then additionally displayed on the display device in order to permit the driver to estimate the surroundings of the vehicle realistically despite the still incomplete information.

For a particularly simple and reliable sensing of objects in the surroundings of the vehicle, the sensor arrangement preferably comprises at least one ultrasound sensor.

The sensor arrangement can particularly easily and cost-effectively comprise a sensor of a parking-space-measuring device which is present in any case and which is arranged on a side wall of the vehicle and provided for measuring parking spaces. Furthermore, the sensor arrangement can comprise at least one distance sensor which is arranged on a front area or rear area of the vehicle and is a component of a parking aid which is present in any case.

In order to give the driver a rapid and informative overview, the display device can be designed to represent the surroundings of the vehicle in a plan view. In this context, in addition to the surroundings of the vehicle, a virtual or schematic plan view of the vehicle can also be represented on the display device.

The surroundings of the vehicle are represented on the display device in the form of a plurality of segments, wherein the segments can be represented in a marked fashion. The marking can then depend on whether or not at least one object has been determined in the respective segment or whether or not the segment has already been passed over by the detection range of the sensor arrangement.

In order to improve even further the assistance for the driver, surroundings of the vehicle which completely enclose the vehicle are preferably displayed on the display device.

Figure 2:
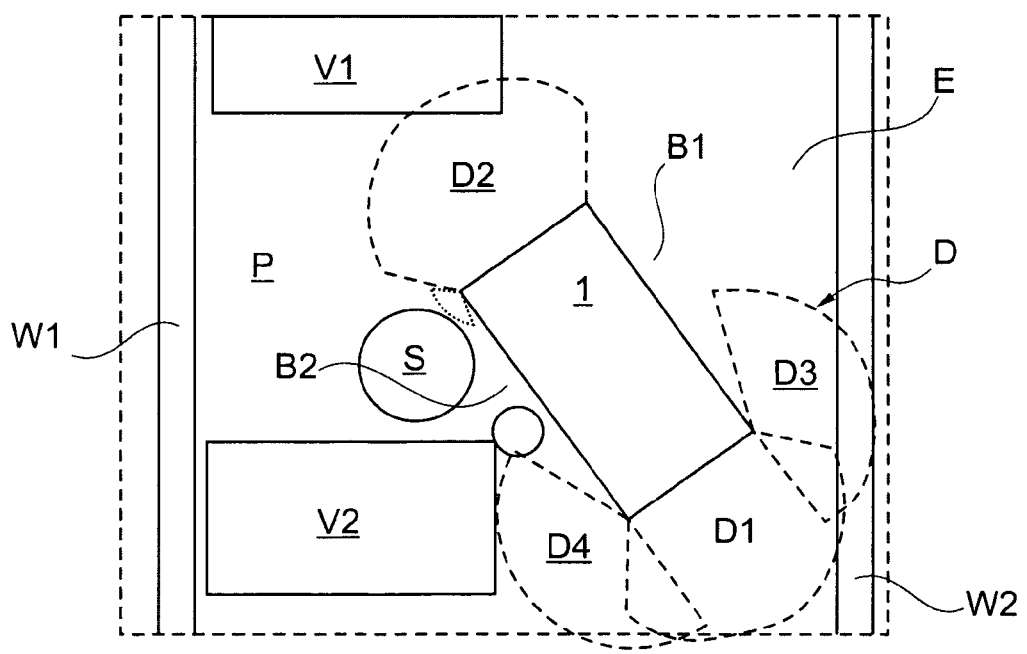
Figure 3:
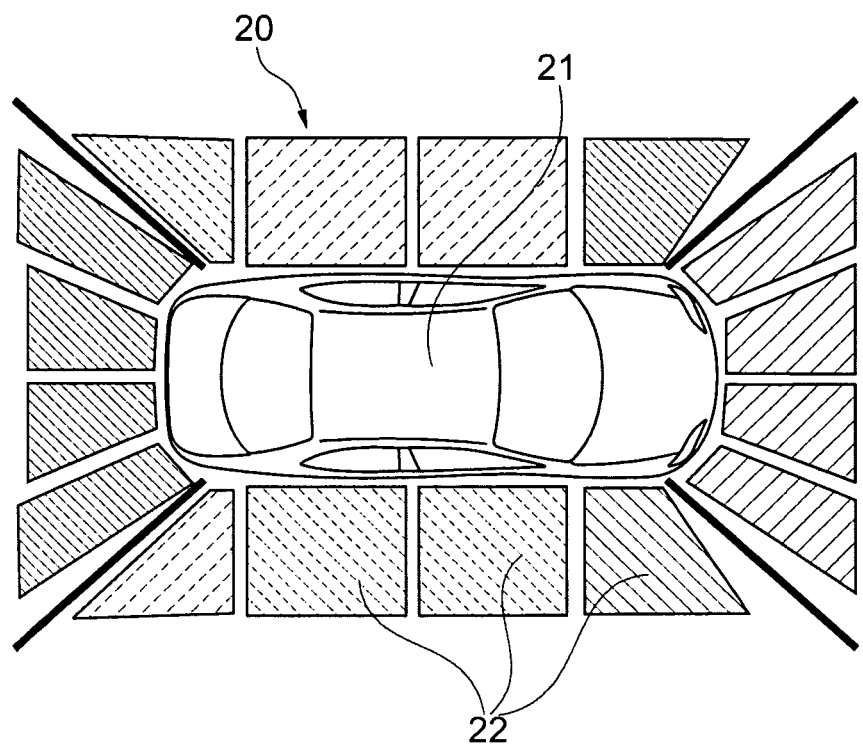
Figure 4:
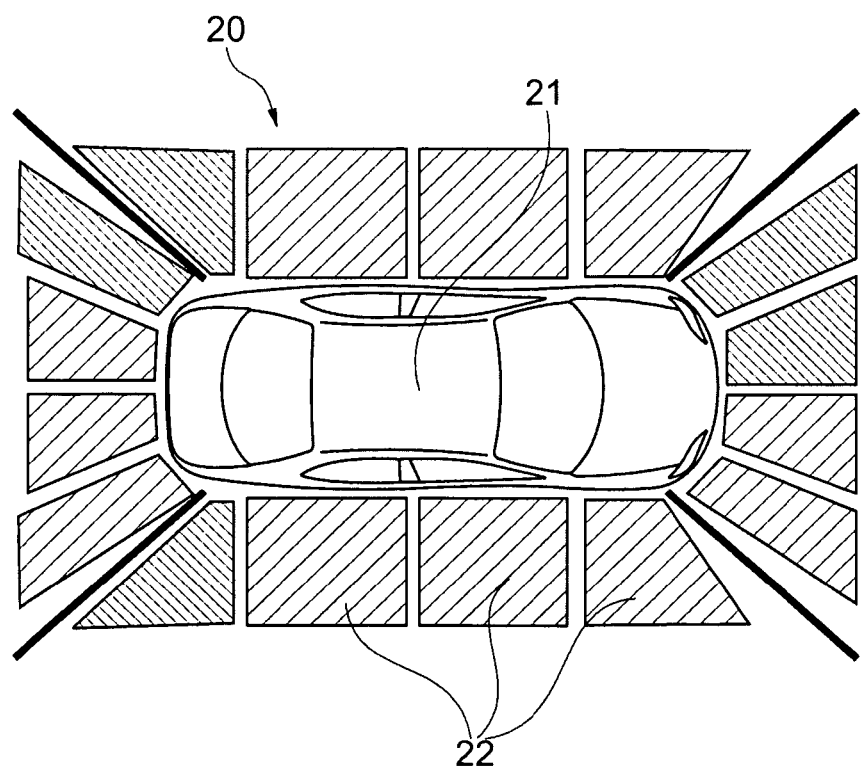

An exemplary embodiment of the invention is explained below in more detail on the basis of a graphic illustration, in which:

FIGS. 1 and 2 show a process of removing a vehicle from a parking space in a schematic plan view, and FIGS. 3 and 4 show a display device for displaying objects in the surroundings of the vehicle.

FIGS. 1 and 2 show a process of removing a vehicle 1 from a transverse parking space P which is bounded on each of its two sides by a parked vehicle V1 and V2, respectively. The vehicle 1 has a device for displaying objects in the surroundings of the vehicle with a sensor arrangement 10 which comprises a plurality of distance sensors 11 on the front bumper with associated detection range D1, a plurality of distance sensors 12 on the rear bumper with detection range D2 and a left-hand lateral sensor 13 and a right-hand lateral sensor 14 with detection ranges D3 and D4, respectively.

The sensors 11-14 are each embodied here as ultrasound distance sensors which are known per se, and are components of a parking aid of the vehicle 1, wherein the front distance sensors 11 and the rear distance sensors 12 are intended for determining the distance of the vehicle 1 from obstacles in front or obstacles behind and for outputting said distance to the driver in conjunction with the parking aid as an optical and/or acoustic signal. The detection ranges D1 and D2 of the front sensors 11 or rear sensors 12 each have, when viewed from above, approximately the shape of a circular segment which is produced as a sum of the circular-segment-shaped detection ranges of the individual sensors 11 and 12 which overlap one another and are each seen from above. The detection ranges D1 and D2 cover the front or the rear of the vehicle respectively over its entire width and point from the vehicle 1 over a maximum extent of approximate 4-6 meters. In this context, the term maximum extent of the respective detection range D1-D4 is intended to mean the distance, from the vehicle, in which an object can still just be sensed by the associated sensor.

The lateral sensors 13 and 14 are each arranged on the left-hand or right-hand side wall of the vehicle 1 in an associated corner region of the front bumper and provided for measuring parking spaces as the vehicle 1 travels past. The sensors 13 and 14 have, when viewed from above, a circular-segment-shaped detection range D3 and D4, respectively, with a maximum extent of approximately 4-6 meters, which extends from the side wall in the transverse direction of the vehicle. The detection ranges D3 and D4 cover the associated side wall of the vehicle 1 over only part of its longitudinal extent. In the exemplary embodiment according to FIGS. 1 and 2 the detection ranges D3 and D4, when viewed from the side, each cover approximately a front third of the associated side wall. However, lateral sensors 13 and 14 with a significantly narrower sensing range, which covers a significantly smaller part of the side wall, could also be provided.

The sensor arrangement 10 composed of the sensors 11-14 has in total a detection range D which is formed by the sum of the detection ranges D1-D4, wherein the detection range D does not completely enclose the vehicle 1, but rather encloses it only partially. The sensor arrangement 10 is therefore not able to sense objects in the entire surroundings around the vehicle 1 by direct measurement. Instead, in each case a blind spot B1 or B2, respectively, adjoins the vehicle 1 in the left-hand and right-hand lateral areas, which blind spot B1 or B2, respectively, runs outside the detection range D and therefore objects cannot directly be sensed by the sensor arrangement 10 in said blind spot B1 or B2, respectively.

In order also to acquire object information for the blind spots B1 and B2, the device for displaying objects also contains storage means for storing the position of objects which have already been sensed by the sensor arrangement 10, a route-sensing device for sensing the route travelled along by the vehicle 1, and a processing device for continuously newly determining the position of the object relative to the vehicle 1 on the basis of the sensed route and the stored object position. Once the position of a stationary object has been sensed by the sensor arrangement 10, said position can therefore also be displayed relative to the vehicle 1 even if the object has already left the detection range D again owing to a movement of the vehicle 1.

The route-sensing device comprises at least one wheel sensor measuring the distance travelled by a vehicle wheel, and a steering angle sensor for measuring the steering angle which has been set and determining therefrom the route which has been travelled along in the transverse direction. In this context, the route-sensing device is also a component of the parking aid of the vehicle 1 and is intended for determining, during the measuring of the parking space, the route which has been travelled along as the vehicle travels past the parking space. The processing device is preferably embodied in an integral fashion with a control device of the parking aid.

In the process of removing a vehicle from a parking space which is shown in FIG. 1 and FIG. 2, the vehicle 1 is moved out of the parking space P in the forward direction. The parking space P is arranged here in a multi-storey car park and is adjacent to a column S in the lateral direction. The rear edge of the parking space P is bounded by a wall W1, while the front edge of the parking space P adjoins a roadway F which is bounded by a second wall W2. In the parked position (not shown) of the vehicle 1 in the parking space P, the wall W1 is firstly located in the detection range D2 of the rear sensors 12, the parked vehicle V1 is located in the detection range D3 of the left-hand sensor 13, and the column S is located in the detection range D4 of the right-hand sensor 14, and said wall W1, parked vehicle V1 and column S are therefore sensed by these sensors 12, 13 and 14 as objects in the surroundings of the vehicle by direct distance measurement. During the subsequent process of removing the vehicle 1 from the parking space, the detection ranges D1-D4 then move forward with the vehicle 1 until finally an intermediate position according to FIG. 1 is reached, in which position the objects W1, V1 and S lie outside the detection ranges D1-D4 and therefore can no longer be sensed by direct measurement by the sensor arrangement 10. The respective positions of the objects W1, V1 and S relative to the vehicle 1 are then continuously determined by the evaluation device 1 on the basis of the stored position during the sensing, and on the basis of the route travelled along since the sensing of the vehicle 1. The positions of the objects are tracked here by the evaluation device until a predefined distance and/or a predefined time period since the sensing are reached.

In the further course of the process of removing the vehicle from a parking space, the vehicle moves further in a forward direction until the position shown in FIG. 2 is reached, in which position the second parked vehicle V2 also moves with its front side into the detection range D4 of the right-hand sensor 14 and can therefore be sensed by the latter in a direct measurement.

The evaluation device is also designed to determine the region E in the surroundings of the vehicle which has been already passed over by the detection range D of the sensor arrangement 10. For this purpose, information about the geometrical extent of the detection range D is stored in the evaluation device. In this context, a continuously identical, pre-stored detection range D can be provided. Alternatively, the detection range D could, however, also be adapted on the basis of the ambient conditions or the functional status of the sensor arrangement 10, for example by correspondingly reducing the assumed detection range D1 when sensors are not available, or are only available to a limited degree, owing to a functional fault. On the basis of the detection range D and the sensed route, the evaluation device then determines which region E of the surroundings of the vehicle has already been passed over by the detection range D of the sensor arrangement 10. Information about the position of stationary objects is then available for this area, while no information is yet available about the rest of the area of the surroundings of the vehicle.

The extent of the area E can be defined here by the evaluation device in such a way that the maximum possible detection range D of the sensor arrangement 10 is always used as a basis i.e. that detection range D which would be possible given a free line of sight of the sensor arrangement 10, irrespective of the detection range D being bounded by an object. Alternatively, the extent of the area E is, as indicated in FIGS. 1 and 2, determined on the basis of the actual possible sensing i.e. in the case of objects which project into the detection range D, the respective object edge is used as a basis as a boundary of the detection range D. The area E is then bounded in this section by the corresponding object edge. In addition to the course of the route travelled along, the chronological profile in which said route was travelled along is preferably also sensed. Only those areas of the surroundings of a vehicle which have been passed over by the detection range D of the sensor arrangement within a predefined period can then be used in the determination of the area E.

The objects in the surroundings of the vehicle and the extent of the area E for which object information is available are displayed to the driver of the vehicle 1 on a display device 20 which is arranged in the passenger compartment of the vehicle 1, for example on a dashboard. Furthermore, there may also be provision for the driver to be additionally warned in an optical or acoustic fashion if a predefined front, rear or lateral minimum distance from one of the objects is undershot or if the vehicle 1 leaves the area E for which object information is available.

The corresponding display device 20 is shown in FIGS. 3 and 4. The display device comprises a screen on which the outline of the vehicle 1 is displayed as a schematic top view 21, and the surroundings around the vehicle 1 are continuously displayed. The surroundings of the vehicle are divided here into individual segments 22 which each have a rectangular shape and represent a corresponding segment of the surroundings of the vehicle. In this context, four segments 22 are respectively provided for the front and rear areas and the two lateral areas of the surroundings of the vehicle, wherein the segments 22 are characterized as a function of the object information which is determined by the evaluation device. A distinction is made here between segments 22 in which at least one object has been detected in the corresponding segment of the surroundings of the vehicle, segments in which no object has been detected in the corresponding segment of the surroundings of the vehicle, and segments 22 which lie outside the sensed area E, i.e. segments 22 for which no object information is yet available. The characterization of the segments 22 can be performed, in particular, by colouring an area, wherein for example segments 22 with at least one object are coloured yellow or red, object-free segments 22 are coloured green and segments 22 for which no object information is yet available are coloured grey.

FIG. 3 shows the display device 20 at the start of the process of removing the vehicle 1 from the parking space P according to FIGS. 1 and 2, wherein the vehicle is still arranged with its rear area directly in front of the wall W1. Accordingly, the four segments 22 in the rear area of the vehicle 1 are coloured yellow in order to indicate to the driver that an object is present here. Furthermore, the front-most segment 22 on the left-hand and right-hand sides of the vehicle is also respectively marked with a yellow colour since in each case an object V1 or S has been respectively sensed by the sensor 13 or 14 here. The other segments 22 on the left-hand and right-hand sides of the vehicle are, in contrast, marked in grey since no object information is yet available for these areas of the surroundings of the vehicle.

FIG. 4 shows the display device 20 in the intermediate position of the vehicle 1 according to FIG. 1. In this position, the entire lateral area of the vehicle 1 has already been sensed by the lateral sensors 13 and 14, with the result that no segments 22 which are indicated in grey are displayed any more. The obstacles V1, S and D1 in the surroundings of the vehicle are displayed by indicating the corresponding segments in yellow.

As an alternative to the display illustrated in FIG. 3, it would also be possible not to represent the surroundings of the vehicle in the form of individual segments but rather to represent them continuously by a changing display of areas with a variable extent or of lines. In this context, the outline of the sensed objects and the extent of the area E for which object information is available could then be displayed. Of course, it would also be possible to indicate, instead of the area E, the remaining area of the surroundings of the vehicle for which no object information is available.

The invention claimed is:

1. A device for displaying objects in surroundings of a vehicle, comprising:
   a sensor arrangement for sensing objects in the surroundings of the vehicle and for determining a position of the objects relative to the vehicle,
   wherein the sensor arrangement comprises:
   a detection range that covers only a partial area of the surroundings of the vehicle,
   a route-sensing device for sensing a route travelled along by the vehicle,
   a processing device for determining, on a basis of the route travelled along by the vehicle, positions of the objects in the surroundings of the vehicle even when said objects have left the detection range of the sensor arrangement, and
   a display device for displaying the objects and their position relative to the vehicle,
   wherein the processing device is configured to determine an area of the surroundings of the vehicle for which no object information is available,
   wherein the display device displays an extent of the area,
   wherein the display device represents the surroundings of the vehicle in the form of a plurality of segments,
   wherein the display device represents the plurality of segments in a marked fashion,
   wherein a marking for a segment of the plurality of segments is a first type marking if object information for the segment is available, and
   wherein the marking for the segment is a second type marking if no object information is available.

2. The device according to claim 1, wherein the sensor arrangement comprises an ultrasound sensor.

3. The device according to claim 1, wherein the sensor arrangement comprises a sensor that is arranged on a side wall of the vehicle and is provided for measuring parking spaces.

4. The device according to claim 1, wherein the sensor arrangement comprises a distance sensor arranged on a front area or a rear area of the vehicle.

5. The device according to claim 1, wherein the display device represents the surroundings of the vehicle in a plan view.

6. The device according to claim 5, wherein the display device is designed to represent, in addition to the surroundings of the vehicle, a virtual or schematic plan view of the vehicle.

7. A method for displaying objects in surroundings of a vehicle, comprising:
   sensing the objects in the surroundings of the vehicle using a sensor arrangement, the sensor arrangement having a detection range configured to cover only a partial area of the displayed surroundings of the vehicle;
   determining positions of sensed objects relative to the vehicle using the sensor arrangement;
   sensing a route travelled along by the vehicle using a route-sensing device;
   determining the positions of the sensed objects on the basis of the route travelled along after said objects have left the detection range of the sensor arrangement;
   displaying the objects and the positions thereof relative to the vehicle using a display device, wherein the display device represents the surroundings of the vehicle in the form of a plurality of segments and wherein the display device represents the plurality segments in a marked fashion;
   displaying a marking for a segment of the plurality of segments as a first marking if object information for the segment is available;
   displaying the marking for the segment of the plurality of segments as a second marking if no object information for the segment is available; and
   continuously determining an area of the surroundings of the vehicle for which no object information is available, wherein an extent of the range is displayed on the display device.

8. The method according to claim 7, wherein the display device represents the surroundings of the vehicle in a plan view.

9. The method according to claim 8, wherein the display device represents, in addition to the surroundings of the vehicle, a virtual or schematic plan view of the vehicle.

10. The device according to claim 1, wherein the surroundings of the vehicle completely enclose the vehicle.

11. The method according to claim 7, wherein the surroundings of the vehicle completely enclose the vehicle.

* * * * *